United States Patent
Das et al.

(10) Patent No.: US 10,678,630 B2
(45) Date of Patent: Jun. 9, 2020

(54) METHOD AND SYSTEM FOR RESOLVING ERROR IN OPEN STACK OPERATING SYSTEM

(71) Applicant: WIPRO LIMITED, Bangalore (IN)

(72) Inventors: Rishav Das, Howrah (IN); Maulik Yagnik, Bangalore (IN); Karanjit Singh, Tarn-Taran (IN)

(73) Assignee: Wipro Limited, Bangalore (IN)

(*) Notice: Subject to any disclaimer, the term of this patent is extended or adjusted under 35 U.S.C. 154(b) by 207 days.

(21) Appl. No.: 15/884,466

(22) Filed: Jan. 31, 2018

(65) Prior Publication Data

US 2019/0188070 A1 Jun. 20, 2019

(30) Foreign Application Priority Data

Dec. 15, 2017 (IN) .............................. 201741045081

(51) Int. Cl.
*G06F 11/07* (2006.01)

(52) U.S. Cl.
CPC ...... *G06F 11/0793* (2013.01); *G06F 11/0706* (2013.01); *G06F 11/0709* (2013.01); *G06F 11/0778* (2013.01); *G06F 11/079* (2013.01); *G06F 11/0751* (2013.01)

(58) Field of Classification Search
CPC ............. G06F 11/0706; G06F 11/0709; G06F 11/0751; G06F 11/0778; G06F 11/079; G06F 11/0793
See application file for complete search history.

(56) References Cited

U.S. PATENT DOCUMENTS

| 2015/0178141 A1* | 6/2015 | Terashita ........... G06Q 10/0639 714/57 |
| 2016/0124823 A1* | 5/2016 | Ruan ................... G06F 11/2257 714/26 |
| 2016/0179600 A1 | 6/2016 | Joshi et al. |

(Continued)

FOREIGN PATENT DOCUMENTS

| CN | 103220180 B | 7/2013 |
| CN | 103227734 A | 7/2013 |

OTHER PUBLICATIONS

Mykyta Gubenko, "Sleep Better at Night: OpenStack Cloud Auto-Healing," OpenStack Videos, https://www.openstack.org/videos/barcelona-2016/sleep-better-at-night-openstack-cloud-auto-healing. 2016, pp. 1-3.

(Continued)

*Primary Examiner* — Joseph R Kudirka
(74) *Attorney, Agent, or Firm* — Finnegan, Henderson, Farabow, Garrett & Dunner, LLP

(57) ABSTRACT

Embodiments of the present disclosure disclose a system and a method for resolving error in an open stack operating system (OS). An error code relating to an error in an open stack OS associated with the error resolution system may be retrieved. One or more services associated with the error code may be determined and at least one of one or more log files from the open stack OS and a resolver may be retrieved. The one or more services are enabled in the error resolution system for the retrieving. Further, a predefined action plan based on the one or more log files and the resolver may be determined. The error in the open stack OS is resolved based on the determined predefined action plan.

18 Claims, 7 Drawing Sheets

(56) References Cited

U.S. PATENT DOCUMENTS

2016/0337084 A1* 11/2016 Wen ..................... H04L 43/065
2018/0173607 A1*  6/2018 Purushothaman .. G06F 11/3612

OTHER PUBLICATIONS

Savithru Lokanath, @ContrailBot—"Bot as a Service (BaaS)," OpenContrail Blog, Oct. 24, 2016, pp. 1-4.
Balazs Gibizer, "Sleep Better at Night: OpenStack Cloud Auto-Healing," OpenStack Summit Videos, https://www.openstack.org/videos/summits/barcelona-2016/sleep-better-at-night-openstack-cloud-auto-healing, pp. 1-3.

* cited by examiner

METHOD AND SYSTEM FOR RESOLVING ERROR IN OPEN STACK OPERATING SYSTEM

TECHNICAL FIELD

The present subject matter is related in general to the field of open stack Operating System (OS), more particularly, but not exclusively to a system and method for resolving an error in an open stack OS.

BACKGROUND

Open stack Operating Systems (OS) may be implemented to provide one or more services to enterprises or business organizations. In recent times, dependency and demand of the enterprises and the business organizations on the open stack OS has increased. With increase in the demand, productivity of the open stack OS needs to be increased. OpenStack OS may be open source Infrastructure-as-a-Service (IaaS) solution that provides a suite of software for creating a cloud by users with minimal effort. The open stack OS may allow users to configure custom-built virtual infrastructure as per their needs. The suite of software provides functions for services such as, distributed computing, different types of data storage, system or database management, network, identity, and/or the like.

As open stack OS may be an open-sourced system and is based on programmable Application Protocol Interfaces (APIs), the users may contribute and configure the one or more services as desired. In some cases, one or more services may be unstable and immature that may cause rapid changes and frequent releases of the services. This may result in decreased reliability on the open stack OS. Upgrading the open stack OS may be one of the solutions to overcome the decrease in reliability. However, the upgrading may be a tedious process and may be detrimental for the business organizations. In some scenarios, during the upgrading, the users may face issues regarding allocation and de-allocation of resources to the open stack OS. Further, upon upgrading, issues such as data unavailability and data loss may cause inconvenience and unwanted it in the one or more services of the open stack OS. For example, a manual error at user end such as, running wrong scripts may cause a cloud environment to slow down for some time that may lead into data unavailability and data loss.

Further, scarcity of experts and skilled professionals for resolving such issues, monitoring and troubleshooting may be a challenge that cloud architect and users face. For example, understanding problem code or alert code of errors may consume some time that may cause delay in providing resolution of an issue to the users.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for resolving an error in an open stack OS. For resolving the error, initially, an error code relating to an error in an open stack OS associated with the error resolution system may be retrieved. One or more services associated with the error code may be determined and at least one of one or more log files from the open stack OS and a resolver may be retrieved. The one or more services may be enabled in the error resolution system for the retrieving. Further, a predefined action plan based on the one or more log files and the resolver may be determined. The error in the open stack OS may be resolved based on the determined predefined action plan.

In an embodiment, the present disclosure relates to an error resolution system for resolving an error in an open stack OS. The error resolution system includes a processor and a memory, and the memory may be communicatively coupled to the processor. The memory stores processor-executable instructions which on execution cause the processor to resolve the error. Initially, an error code relating to an error in an open stack OS associated with the error resolution system may be retrieved. One or more services associated with the error code may be determined and at least one of one or more log files from the open stack OS and a resolver may be retrieved. The one or more services may be enabled in the error resolution system for the retrieving. Further, a predefined action plan based on the one or more log files and the resolver may be determined. The error in the open stack OS may be resolved based on the determined predefined action plan.

In an embodiment, the present disclosure relates to a non-transitory computer readable medium including instructions stored thereon that when processed by at least one processor cause a device to perform operations for resolving an error in an open stack OS. For resolving the error, initially, an error code relating to an error in an open stack OS associated with the error resolution system may be retrieved. One or more services associated with the error code may be determined and at least one of one or more log files from the open stack OS and a resolver may be retrieved. The one or more services may be enabled in the error resolution system for the retrieving. Further, a predefined action plan based on the one or more log files and the resolver may be determined. The error in the open stack OS may be resolved based on the determined predefined action plan.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
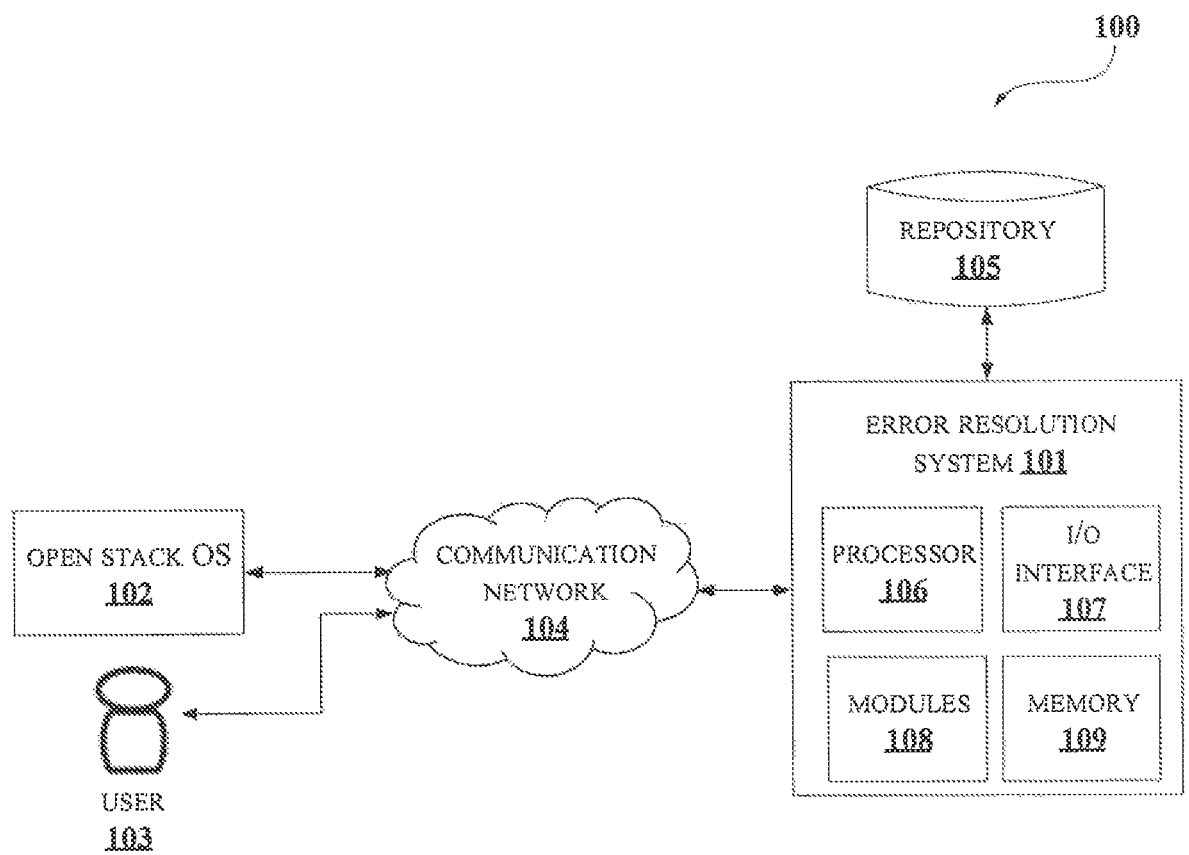
FIG. 1 illustrates an exemplary environment for resolving error in an open stack OS in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Enterprises and business organizations avail one or more services from an open stack OS. In some scenarios, there may be an issue or error associated with the one or more services of the open stack OS. The present disclosure provides a system and method for resolving the error of the open stack OS. An automated mechanism for understanding and resolving the error is disclosed. The system of the present disclosure understands the error and determines service which is associated with the error. By retrieving log files and resolvers associated with the determined service, a predefined action plan is determined for resolving the error. In case, the error is determined to a new error, the system of the present disclosure discloses to perform correlation analysis on the error to predict the service which is related to the error and further resolve the error. Overall, the present disclosure provisions an Artificial Intelligence (AI) solution that facilitates self-healing of the open stack OS 102.

FIG. 1 illustrates an exemplary environment 100 of an error resolution system 101 for resolving an error in an open stack OS 102 associated with the error resolution system 101. The exemplary environment 100 comprises the error resolution system 101, the open stack OS 102, user 103, a communication network 104 and a repository 105. The open stack OS 102 may be an operating system or a service provider system which may be enabled to provide one or more services to one or more users associated with the open stack OS 102. The user 103 may be an entity or a person associated with at least one of the open stack OS 102 and the error resolution system 101. In an embodiment, the user 103 may be a system which may be configured to communicate with the error resolution system 101, for resolving the error. The open stack OS 102 and the user 103 may communicate with the error resolution system 101 via the communication network 104. The error resolution system 101 may communicate with at least one of the open stack OS 102 and the user 103 for retrieving and providing data which may be used for the resolving the error in the open stack OS 102. In an embodiment, error resolution system 101 may be embedded in the open stack OS 102 for resolving the error in the open stack OS 102. In an embodiment, the error resolution system 101 may be associated with plurality of open stack OS (not shown in the figure) for resolving error of each of the plurality of open stack OS 102. Each of the plurality of the open stack OS 102 may communicate with the error resolution system 101 via the communication network 104. In an embodiment, the communication network 104 may include, without limitation, a direct interconnection, Local Area Network (LAN), Wide Area Network (WAN), wireless network (e.g., using Wireless Application Protocol), the Internet, and the like.

Further, the error resolution system 101 includes a processor 106, an I/O interface 107, one or more modules 108 and a memory 109. In some embodiments, the memory 109 may be communicatively coupled to the processor 106. The memory 109 stores processor executable instructions, which, on execution, may cause the error resolution system 101 to resolve the error relating to the open stack OS 102. The error resolution system 101 may be implemented in a variety of computing systems, such as a laptop computer, a desktop computer, a Personal Computer (PC), a notebook, a smartphone, a tablet, e-book readers, a server, a network server, and the like.

For resolving the error relating to the open stack OS 102, initially, the error resolution system 101 retrieves an error code relating to the error in the open stack OS 102. In an embodiment, the error code may be a query, or a ticket raised by the user 103 for the error associated with the open stack OS 102. In an embodiment, the error code may comprise one or more keywords which may be relating to an error in the open stack OS 102. Further, the error resolution system 101 determines one or more services associated with the error code.

In an embodiment, the one or more services associated with the error code may be determined based on analysis of the one or more services. For the analysis of the one or more services, a matrix indicating one or more values associated with the error code in relation with each the one or more services in the error resolution system 101 may be generated. Further, each of the one or more values may be decoded to for identifying the error code to be associated with at least one of the one or more predefined errors and a new error. In an embodiment, the decoding includes reducing the matrix to one set value using a pointer and further performing the decoding on the one set value. The one set value may be one of the one or more values in the matrix. In an embodiment, a pointer may be enabled to select the one set values from the matrix based on row and column associated with each of the one or more values. Upon determining the one set value, a verification module may be executed on the one set value for identifying the error code to be associated with one of the one or more services and the new error.

When the error code may be identified to be associated with the one or more predefined errors, the one or more services associated with the error code may be identified. When the error code may be identified to be associated with the new error, correlative analysis of the error code and each of the one or more predefined errors may be performed for determining the one or more services associated with the error code. For the correlative analysis, one or more keywords associated with the error code may be ranked based on one or more parameters. Further, a correlation co-efficient associated with the error code may be determined based on the ranking. The correlation co-efficient may be compared with a predefined threshold value to identify one of the error code to be in relation with the one or more predefined errors, the error code to be in no relation with the one or more predefined errors and the error code to be different from the one or more predefined errors. In an embodiment, when the correlation coefficient is lesser than the predefined threshold value, the error code may be identified to be in relation with the one or more predefined errors. In an embodiment, when the correlation coefficient is equal to the predefined threshold value, the error code may be identified to be in no relation with the one or more predefined errors. In an embodiment, when the correlation coefficient is greater than the predefined threshold value, the error code may be identified to be different from the one or more predefined errors. When the error code may be identified to be associated with one or more predefined errors, the one or more services associated with the one or more predefined errors may be determined to be the one or more services of the error code.

Upon determining the one or more services of the error codes, at least one of one or more log files from the open stack OS 102 and a resolver may be retrieved. For retrieving at least one of the one or more log files and the resolver, the one or more services needs to be enabled in the error resolution system 101. Hence, determined one or more services may be identified to be one of enabled and disabled by the error resolution system 101, before retrieving at least one of one or more log files from the open stack OS 102 and a resolver. In an embodiment, the one or more services may be identified to be one of enabled and disabled based on an identification number associated with each of the one or more services in the error resolution system 101. At least one of the one or more log files and the resolver may be retrieved when the one or more services are identified to be enabled in the error resolution system 101. When the one or more services are identified to be disabled in the error resolution system 101, user requirement data from the user 103 may be retrieved. Further, based on the user requirement data, a resource package may be allocated in the error resolution system 101 to the one or more services. The one or more services in the error resolution system 101 may be enabled based on the resource package for retrieving at least one of the one or more log tiles and the resolver.

In an embodiment, the at least one of the one or more log files and the resolver of each of the one or more services may be stored in a corresponding memory session assigned by error resolution system 101.

Upon retrieving at least one of the one or more log files and the resolver, a predefined action plan may be determined based on at least one of the one or more log files and the resolver. The error in the open stack OS 102 may be resolved based on the determined predefined action plan.

In an embodiment, the error resolution system 101 may receive data for resolving the error through the I/O interface 107 of the error resolution system 101. Also, the error resolution system 101 may transmit data for resolving the error through the I/O interface 107. The I/O interface 107 may be coupled with the processor 106 of the error resolution system 101.

Figure 2:
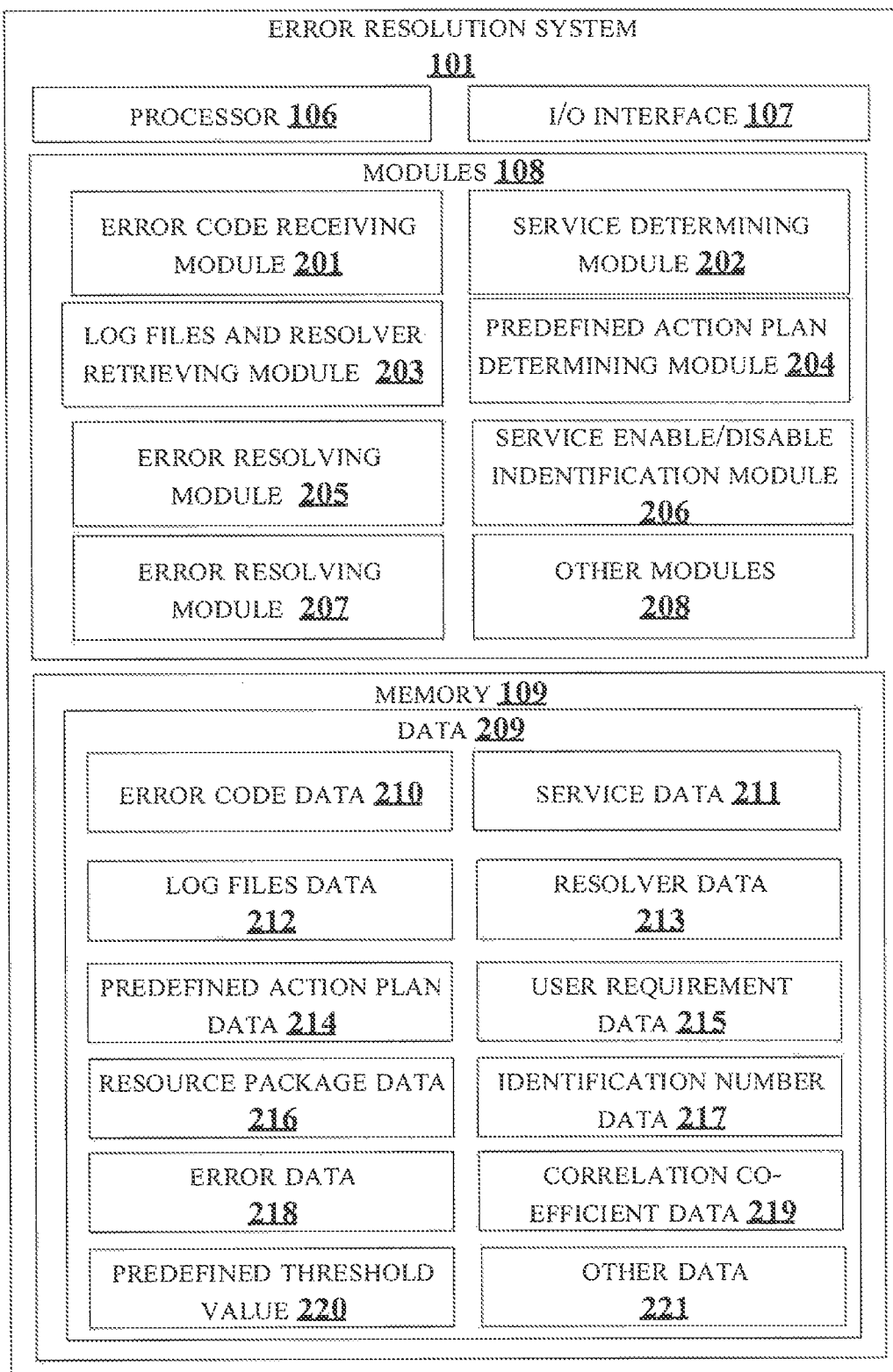
FIG. 2 shows a detailed block diagram of an error resolution system for resolving error in an open stack OS in accordance with some embodiments of the present disclosure.

FIG. 2 shows a detailed block diagram of the error resolution system 101 for resolving errors in the open stack OS 102 in accordance with some embodiments of the present disclosure.

The data 209 in the memory 109 and the one or more modules 108 of the error resolution system 101 may be described herein in detail.

In one implementation, the one or more modules 108 may include, but are not limited to, an error code receiving module 201, a service determining module 202, a log-files and resolver retrieving module 203, a predefined action plan determining module 204, an error resolving module 205, a service enable/disable identification module 206, a service enabling module 207 and one or more other modules 208, associated with the error resolution system 101.

In an embodiment, the data 209 in the memory 109 may comprise an error code data 210 (also referred as an error code 210), a service data 211 (also referred as a service data 211), a log file data 212 (also referred as one or more log files 212), a resolver data 213 (also referred as a resolver 213), a predefined action plan data 214 (also referred as a predefined action plan 214), user requirement data 215, a resource package data 216 (also referred as the resource package 216), an identification number data 217 (also referred as an identification number 217), a predefined error data 218 (also referred as one or more predefined errors 218), a correlation coefficient data 219 (also referred as a correlation coefficient 219), a predefined threshold value 220 and other data 221 associated with the error resolution system 101.

In an embodiment, the data 209 in the memory 109 may be processed by the one or more modules 108 of the error resolution system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The one or more modules 108 when configured with the functionality defined in the present disclosure may result in a novel hardware.

The error resolution system 101 of the present disclosure may be configured to resolve an error in the open stack OS 102. In an embodiment, the open stack OS 102 may be a cloud system which may be configured to provide one or more services 211 to the user 103. The user 103 may be an enterprise, a business organization or any person who may be associated with at least one of the open stack OS 102 and the error resolution system 101. At first, the open stack OS 102 may trigger an error alert through a dashboard. The dashboard may be at least one of open stack Horizon and an external alert management service which may be configured to retrieve the error alert of the open stack os 102. Once the error alert may be triggered, a new process may be created in the open stack OS 102 and one or more Transmission Control Protocol (TCP) sockets associated with the open stack OS 102 may be activated. By the activation, communication between the open stack OS 102 and the error resolution system 101 may be established. The open stack OS 102 may communicate with the error resolution system 101 via the communication network 104 as shown in FIG. 1. The error alert in form the error code 210 may be received by the error code 210 receiving module 201 via the communication network 104. In the embodiment, the error code 210 may be received through the user 103 or a server gateway to secure communication packets carrying the error code 210. In an embodiment, the error code 210 may be an error identification number associated with the error alert. For example, the error code associated with an error code relating to networking in the open stack OS 102 may be #8782. Similarly, the error code associated with an error relating to computation in the open stack OS 102 may be #9834. Upon receiving the error code 210, the service determining module 202 determines the one or more services 211 associated with the error code 210. Consider the open stack OS 102 may be a cloud system, the one or more services 211 may include, but are not limited to orchestration, dashboard, bare metal, identity service, database service, image service, telemetry, data processing, object storage, block storage networking and compute.

The orchestration in the open stack OS 102 may be facilitated by Heat service. The orchestration allows cloud services and resources to be orchestrated through a template. Any inputs or user requirement from the user 103 may be given via the template in a Command Line Interface (CLI). The CLI communicates with API such as, Representation State Transfer (REST) API to process the inputs in the template.

The dashboard on the open stack OS 102 may be facilitated by Horizon service which provides a portal or a Graphical User Interface (GUI) to the user 103. The user 103 may be able to manage cloud resources and services of the open stack OS 102 through the dashboard.

The bare metal on the open stack OS 102 may be facilitated by Ironic service. In some situations, the user 103 may prefer physical resources or hardware over virtual resources for a cloud application. In such scenarios, Ironic supports feature of allowing users to directly use physical resources.

The identity service on the open stack OS 102 may be facilitated by Keystone service. The Keystone service offers API based user authentication of the user 103, user authorization as well as discovery of services through an identity API.

The database services on the open stack OS 102 may be facilitated by Trove service. The Trove service may provide Database-as-a-Service (DaaS) for managing and automating different Database Management Systems (DBMS) such as relational DBMS, No Structured Query Language (NoSQL) and the like.

The image service on the open stack OS 102 may be facilitated by Glance service. The Glance service provides a central repository or a catalog for storing virtual images of cloud services and resources through which service discovery, registration and retrieval may be provisioned.

The telemetry on the open stack OS 102 may be facilitated by Ceilometer service. The Ceilometer service collects usage data from various components of the open stack OS 102. The data may be used for billing as well as tracking of resources and providing alerts across the cloud system.

The data processing on the open stack OS 102 may be facilitated by Sahara-all service. The Sahara-all may allow the user 103 to use various data processing frameworks such as Apache™ Hadoop®, Apache Spark™, Apache Storm™ or the like in the open stack OS 102.

The object storage on the open stack OS 102 may be facilitated by Swift proxy server which provides a storage platform that may be API-accessible for REST API based applications.

The block storage on the open stack OS 102 may be facilitated by Cinder which helps in managing volumes and storage of instances in the open stack OS 102 in a block level manner.

The networking on the open stack OS 102 may be facilitated by Neutron which provides the user 103 to deploy and manage networking services for computing in the open stack OS 102.

The compute on the open stack OS 102 may be facilitated by Nova which helps in deploying and managing a large number of Virtual Memories (VMs) and various instances for handling different computing tasks of users.

The one or more services 211 associated with the error code 210 may be determined based on analysis of the one or more services. In an embodiment, an Artificial Neural Networking (ANN) mechanism may be implemented for analysing the one or more services. For the analysis of the one or more services 211, a matrix indicating one or more values associated will the error code 210 in relation with each the one or more services 211 in the error resolution system 101 may be generated. In an embodiment, the one or more values may be set of instance values of the one or more pre-defined errors 218 used for generating the matrix. An exemplary representation of the matrix may be as shown in Table 1 below:

TABLE 1

|    | 00     | 01     | 11     | 10     |
|----|--------|--------|--------|--------|
| 00 | #40971 | #40991 | #40791 | #40721 |
| 01 | #40821 | #41794 | #42889 | #43417 |
| 11 | #49751 | #42531 | #43341 | #47912 |
| 10 | #49751 | #41571 | #42412 | #44712 |

Further, each of the one or more values in the matrix may be decoded to identify the error code 210 to be associated with at least one of the one or more predefined errors 218 and the new error. In an embodiment, the decoding includes reducing the matrix to a one set value using the pointer and further performing the decoding on the one set value. The pointer may be enabled to select the one set value from the matrix based on row value and column value associated with each of the one or more services. In an embodiment, each of the one or more services may be associated with at least one row and column value. Further, corresponding value from the one or more values of the error code may be placed in the matrix at said row value and said column value. For example, consider the matrix illustrated in Table 1, the Horizon service may be associated with row value of "10" and column value of "00". Therefore, from the matrix, the one set value indicating #40721 may be associated with the error code relating to the Horizon service. Upon selecting the one set value, the verification module may be executed on the one set value for identifying the error code to be associated with one of the one or more services and the new error. In an embodiment, the verification module may be executed on each of the one or more values for identifying the error code to be associated with one of the one or more services and the new error. In an embodiment, the verification module may include to check one or more conditions on the one set value selected by the pointer. In an embodiment, by checking the one or more condition, the one set value may be identified to be associated the error code received by the error resolution system 101. Thereby, the service associated with the one set value may be determined to be the service associated with the error code. In a scenario where none of the one or more values satisfy the one or more conditions, the error code may communicate with the user to identify the service associated the error. In another embodiment, when none of the one or more values satisfy the one or more conditions, the error code may be identified to be the new error code. One or more techniques, known to a person skilled in the art may be implemented as the verification module in the error resolution system 101. In an embodiment, by using the pointer to select the one set value and executing the verification module, the error in a predefined path of the open stack OS 102 may be identified by the error resolution system 101.

In an embodiment, matrix may be updated by based on new errors identified by the error resolution system, using eigen vectors of the one or more values. In an embodiment, eigen vector may be calculated for combination of different row values and column values. For example, an eigen vector for row value of "11" and column value of "00" may be computed, eigen value for row value of "10" and column value of "10" may be computed and so on. Further, the computed eigen vector may be clubbed into the matrix for updating the matrix. The eigen vector may be provided with a value based on keywords associated with the error code relation to corresponding row and column value. By updating the matrix, number of row values, number of column values and number of one or more values may be increased.

Further, when the error code 210 may be identified to be associated with the one or more predefined errors 218, the one or more services associated with the error code 210 may be identified. When the error code 210 may be identified to be associated with the new error, the correlative analysis of the error code 210 and each of the one or more predefined errors 218 may be performed for determining the one or more services 211 associated with the error code 210. For the correlative analysis, one or more keywords associated with the error code 210 may be ranked based on one or more parameters.

In an embodiment, the ranking may be based on logs associated with the error codes. For example, consider the logs may be found to "panic in packet transmission" in the networking of the open stack OS 102 and "panic in process- ID 345875" in the computation of the open stack OS 102. The ranking may be based on number times the logs are occurred for resolving of error in the error resolution system. Consider the logs of networking is greater than the logs of the computation. Also, the networking may be provided rank "1" and the computation may be provided rank "2". In an embodiment, the ranking may be based on time duration in occurrence of said logs.

For example, consider one or more errors alerts associated with Nova service to be "kernel_Panic", "Mem_failed" and "Backup_initiated" and one or more error alerts associated with Sahara service to be "database_failed", "database_ failed" and "bugfected". In an embodiment, the ranking may be based on frequency of keyword found with associated alert. If panic may be the keyword with high frequency in the Nova service and "database_failed" may be in the Sahara service, the service determining module 202 may checks on number of times the keywords may be related to each other and accordingly perform ranking. An exemplary representation of the ranking may be as illustrated in Table 2, given below:

TABLE 2

| Error alert | Rank | Error alert | rank |
| --- | --- | --- | --- |
| kernel_Panic | 3 | database_failed | 2 |
| Mem_failed | 6 | TCP connectivity failed | 5 |
| Backup_initated | 4 | bugfected | 1 |

Further, a correlation co-efficient 219 associated with the error code 210 may be determined based on the ranking. The correlation co-efficient 219 may be compared with a predefined threshold value 220 to identify one of the error code 210 to be in relation with the one or more predefined errors 218, the error code 210 to be in no relation with the one or more predefined errors 218 and the error code 210 to be different from the one or more predefined errors 218. In an embodiment, when the correlation coefficient is lesser than the predefined threshold value 220, the error code 210 may be identified to be in relation with the one or more predefined errors 218. In an embodiment, when the correlation coefficient is equal to the predefined threshold value 220, the error code 210 may be identified to be in no relation with the one or more predefined errors 218. In an embodiment, when the correlation coefficient is greater than the predefined threshold value 220, the error code 210 may be identified to be different from the one or more predefined errors 218. When the error code 210 is identified to be associated with one or more predefined errors 218, the one or more services 211 associated with the one or more predefined errors 218 may be determined to be the one or more services 211 of the error code 210.

In an embodiment, the correlation co-efficient 219 may be computed using equation 1, given below:

$$\rho = 1 - \frac{6 \sum \delta^2}{n(n^2 - 1)} \quad (1)$$

where, ρ is the correlation co-efficient 219;
n is number of errors; and
δ is difference is raking of keyword and the one or more predefined error 218.

In an embodiment, δ may be referred to as a deviation associated with services. In an embodiment, by the deviation, at least one of relativity and error flow associated with the services may be determined.

Upon determining the one or more services 211 of the error code 210, at least one of one or more log files 212 from the open stack OS 102 and a resolver 213 may be retrieved by the log files and resolver retrieving module 203. For retrieving at least one of the log files 212 and the resolver 213, the one or more services 211 needs to be enabled in the error resolution system 101. Hence, before retrieving at least one of one or more log files 212 from the open stack OS 102 and a resolver 213, determined one or more services 211 may be identified to be one of enabled and disabled in the error resolution system 101. In an embodiment, the one or more services 211 may be identified to be one of enabled and disabled based on an identification number 217 associated with each of the one or more services 211 in the error resolution system 101. In an embodiment, the identification number 217 associated with each of the one or more services 211 may be stored in the repository 105 associated with the error resolution system 101. When the one or more services 211 is determined, a check for presence of the identification number 217 associated with the one or more services 211 in the repository 105 may be performed. The service enable/disable identification module identifies the one or more services 211 to be enabled when the identification number 217 is present in the repository 105. The service enable/disable identification module identifies the one or more services 211 to be disabled when the identification number 217 is not present in the repository 105. An example for the identification number 217 stored in the repository 105 may be illustrated in Table 3, given below

TABLE 3

| SI NO | Service | Identification Number. |
|---|---|---|
| 1. | Nova | WT#NV1 |
| 2. | Neutron | WT#NU1 |
| 3. | Cinder | WT#CD1 |

In an embodiment, the identification number 217 may help in understanding specific type of service for resolving errors, which further helps to communicate with the resolver 213 and determine the predefined action plan.

At least one of the one or more log files 212 and the resolver 213 may be retrieved when the one or more services 211 are identified to be enabled in the error resolution system 101. When the one or more services 211 are identified to be disabled in the error resolution system 101, user requirement data 215 from the user 103 may be retrieved. Further, based on the user requirement data 215, a resource package 216 may be allocated in the error resolution system 101 to the one or more services 211. The one or more services 211 in the error resolution system 101 may be enabled based the resource package 216 for retrieving at least one of the one or more log files 212 and the resolver 213. In an embodiment, by allocating the resource package 216, a new identification number 217 may be linked with a new service of the new error. In an embodiment, the resource package 216 may be downloaded and installed in the error resolution system 101 with the help of the resolver 213.

The log files 212 may be retrieved from log file location in the open stack OS 102. Each of the one or more services 211 may be associated with respective log file location.

For example, consider error may be associated with Nova. Nova may comprise various sections of errors classified. For Nova, there may be 8 types of log bundles according to problem code classification. Table 4 given below shows the log locations associated with Nova:

TABLE 4

| Nova Service | Log files location |
|---|---|
| a. Open Stack Compute API service | /var/log/nova/nova-api.log |
| b. Open Stack Compute certificate server | /var/log/nova/novacompute.log |
| c. Open Stack Compute service | /var/log/nova/novacompute.log |
| d. Open Stack Compute Conductor service | /var/log/nova/novaconductor.log |
| e. Open Stack Compute VNC console authentication server | /var/log/nova/novaconsoleauth.log |
| f. Informational messages | /var/log/nova/novamanage.log |
| g. Open Stack Compute NoVNC Proxy service | /var/log/nova/novanovncproxy.log |
| h. Open Stack Compute Scheduler service | /var/log/nova/novascheduler.log |

As per the error code 210, the log file and the resolver 213 retrieving module navigates to respective log file locations, which may be predefined for the resolver 213.

In an embodiment, each of the one or more services 211 may be associated with a resolver 213. In an embodiment, a switch may be implemented in the error resolution system 101 to connect to the resolver 213 based on the determined one or more services 211. The resolver 213 for each of the one or more services 211 may be stored in the repository 105 and the switch may enable to retrieve the resolver 213 based on the one or more services 211.

Upon retrieving at least one or more log files 212 and the resolver 213, the one or more log files 212 and the resolver 213 of each of the one or more services 211 may be stored in a corresponding memory session assigned by error resolution system 101. In an embodiment, a virtual memory may be used to store N number of sessions at a time. The memory may also be shared with different customer end devices running the open stack OS 102. During any operation or execution process, memory session of each of the one or more services 211 may be created and accordingly memory may be allocated for each of the memory session. In an embodiment, upon resolving of the error, the memory session may be de-allocated automatically.

Upon retrieving at least one of the log files and the resolver 213, a predefined action plan 214 may be determined based on at least one of the one or more log files 212 and the resolver 213. The error in the open stack OS 102 may be resolved by the error resolving module 205 based on the determined predefined action plan. In an embodiment, when the predefined action plan 214 determining module 204 is not able to determine the predefined action plan, the error resolution system 101 may generate a resolution for the error based on historic data associated with previous resolution. For example, if the predefined action plan is not determined for an error where computation is hung in the open stack OS 102, the error resolution system 101 may generate the resolution to said error to be opening maintenance window for reboot. If the predefined action plan is not determined for an error where kernel is hung due to a critical process in the computation, the error resolution system 101 may generate the resolution to said error to be killing the critical process.

In an embodiment, the other module 208 may include a health check module which may be configured to perform health check of the open stack OS 102. In an embodiment, the health check module may send a request for health check to the open stack OS 102. Based on the request, the open stack OS 102 may acknowledge to the error resolution system 101.

The other data 221 may store data, including temporary data and temporary files, generated by modules for performing the various functions of the error resolution system 101. The one or more modules 208 may also include other modules to perform various miscellaneous functionalities of the error resolution system 101. It will be appreciated that such modules may be represented as a single module or a combination of different modules.

Figure 3A:
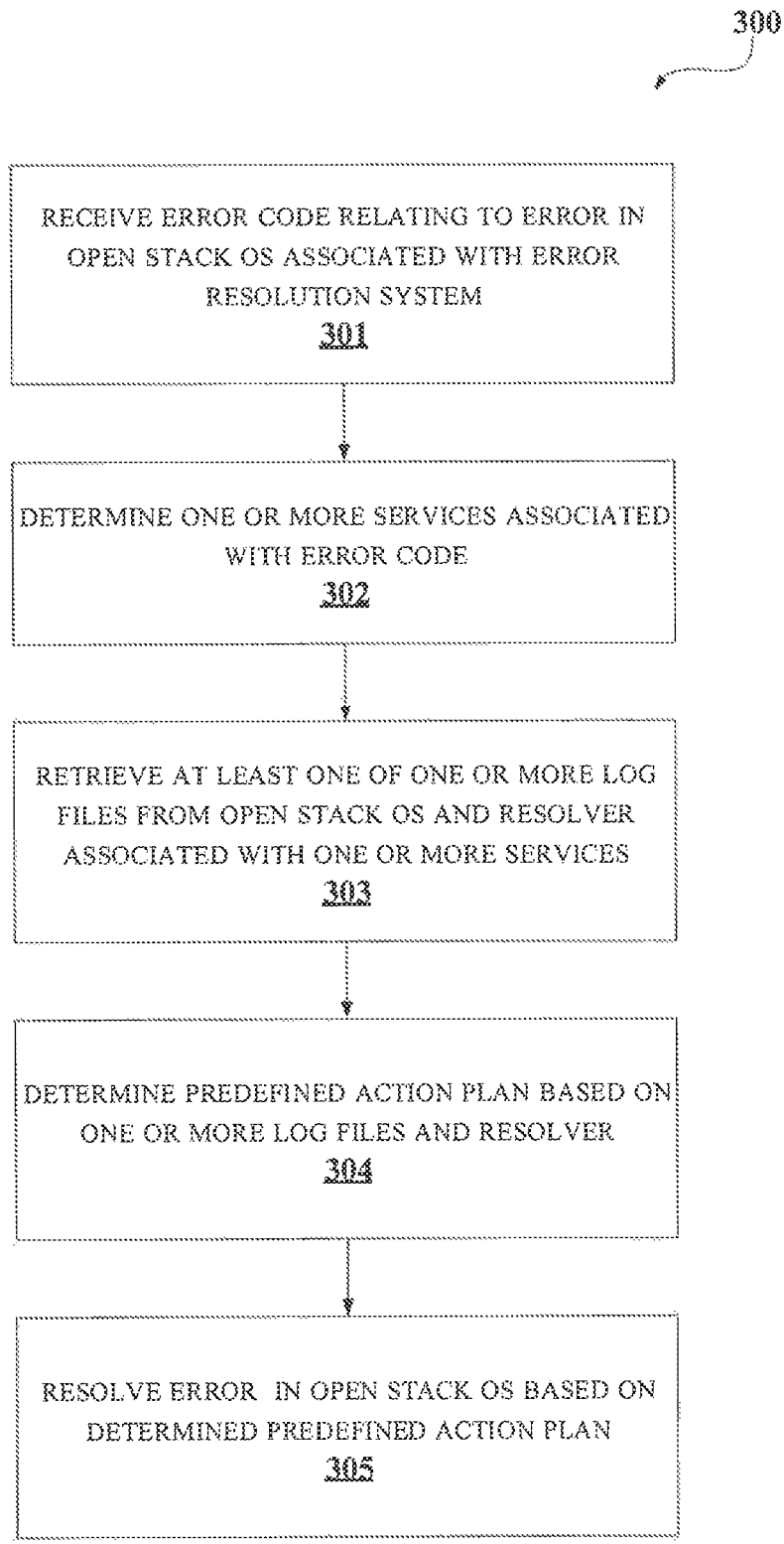
FIG. 3a illustrates a flowchart showing an exemplary method for resolving error in an open stack OS in accordance with some embodiments of present disclosure.

FIG. 3a illustrates a flowchart showing an exemplary method for resolving the error in the open stack OS 102 in accordance with some embodiments of present disclosure.

At block 301, the error code 210 receiving module 201 of the error resolution system 101 may receive error code 210 relating to the error in the open stack OS 102 associated with the error resolution system 101.

At block 302, the service determining module 202 of the error resolution system 101 may determine the one or more services 211 associated with the error code 210.

At block 303, the log files and resolver retrieving module 203 of the error resolution system 101 retrieves at least one of the one or more log files 212 from the open stack OS 102 and the resolver 213, associated with the one or more service. For retrieving at least one of the one or more log files 212 and the resolver 213, the one or more service may be enabled in the error resolution system 101.

Figure 3B:
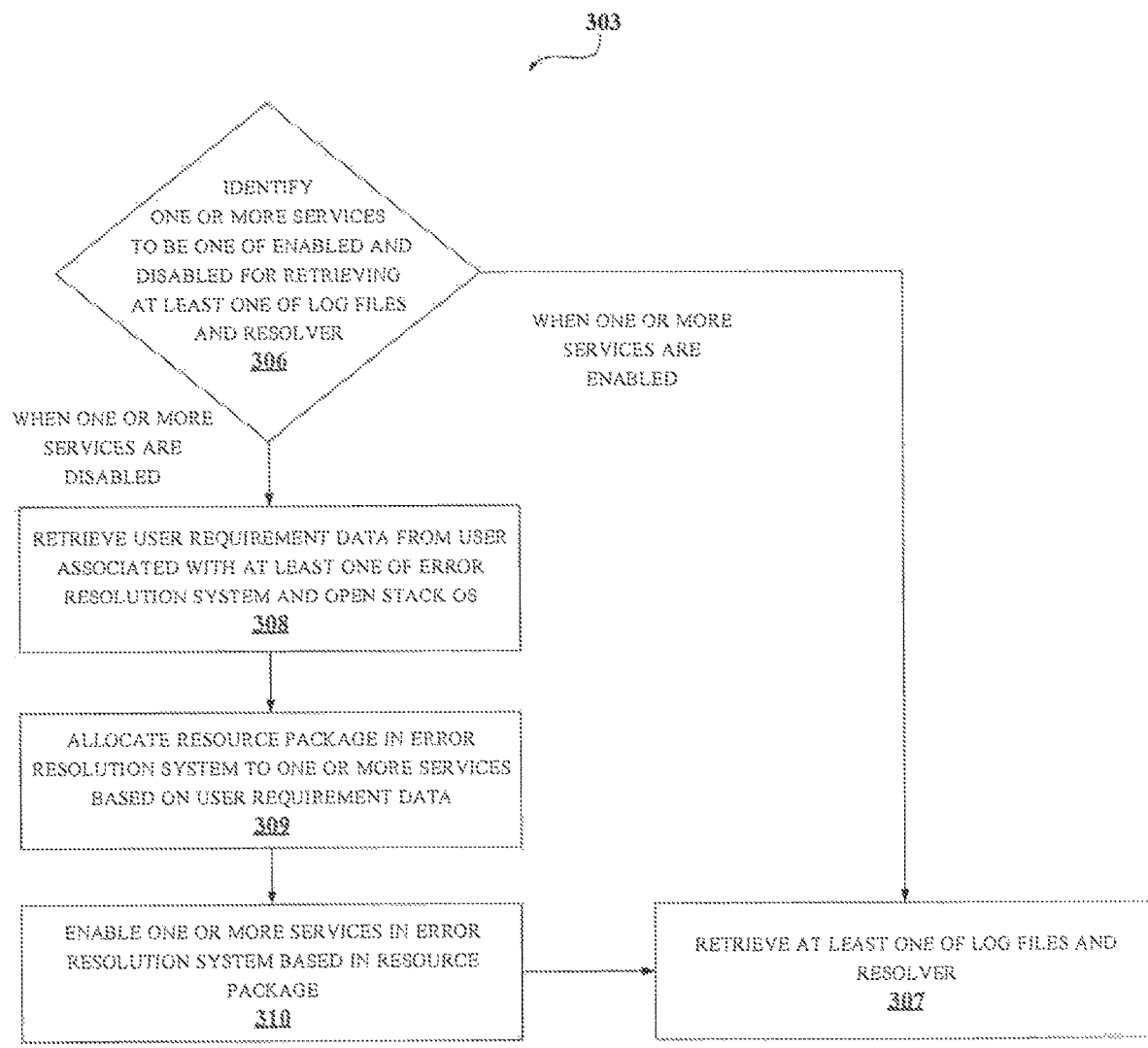
FIG. 3b illustrates a flowchart showing an exemplary method for retrieving one of log files and resolver in accordance with some embodiments of present disclosure.

FIG. 3b illustrates a method for retrieving at least one of one or more log files 212 and the resolver 213.

At block 306, the service enable/disable identification module identifies the one or more services 211 to be one of enabled and disabled for retrieving at least one of the one or more log files 212 and the resolver 213. When the one or more services 211 is identified as enabled, steps in block 307 may be performed. When the one or more services 211 is identified to be disabled, steps in block 308 may be performed.

At block 307, at least one of the one or more log files 212 and the resolver 213 may be retrieved, when the one or more services 211 are identified to be enabled.

At block 308, the service enabling module of the error resolution system 101 retrieves the user requirement data 215 from the user 103 associated with at least one of error resolution system 101 and the open stack OS 102.

At block 309, the service enabling module allocates the resource package 216 in error resolution system 101 to one or more services 211 based on user requirement data 215.

At block 310, the service enabling module enables one or more services 211 in error resolution system 101 based on the resource package 216. Upon enabling the one or more services 211 at block 310, step at block 307 may be performed i.e., upon enabling the one or more services 211, at least one of the one or more log files 212 and the resolver 213 may be retrieved.

Referring to FIG. 3a, at block 304, upon retrieving at least one of the one or more log files and the resolver 213, the predefined action plan 214 determining module 204 of the error resolution system 101 determines the predefined action plan 214 based on at least one of the one or more log files 212 and the resolver 213.

At block 305, the error resolving module 205 of the error resolution system 101 resolves error in open stack OS 102 based on the predefined action plan.

Figure 3C:
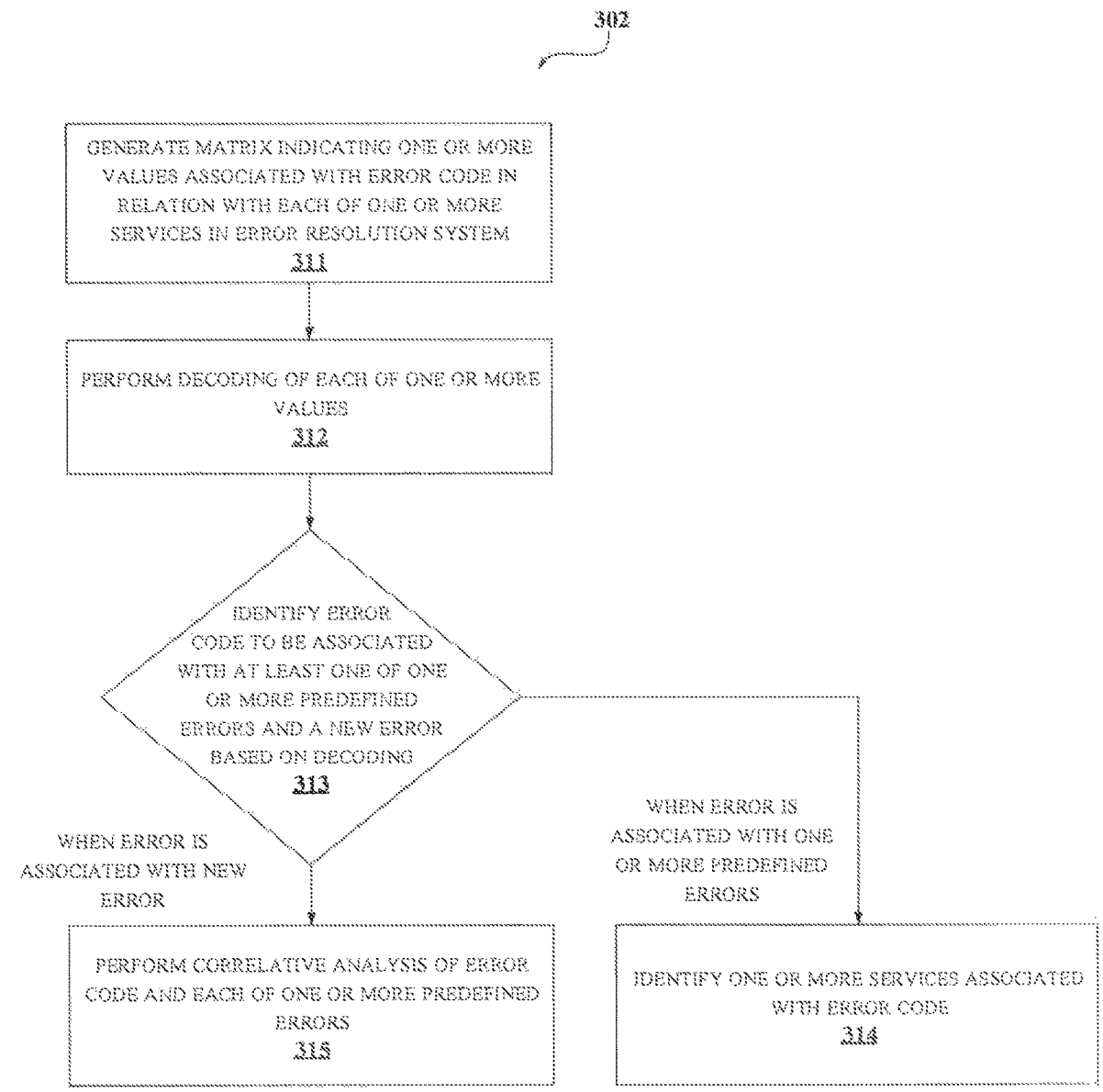
FIG. 3c illustrates a flowchart showing an exemplary method for determining one or more services associated with error code in accordance with some embodiments of present disclosure.

FIG. 3c illustrates a flowchart showing an exemplary method for determining the one or more services 211 associated with the error code 210 in accordance with some embodiments of present disclosure.

At block 311, the service determining module 202 generates matrix indicating value of the error code 210 in relation with each of the one or more services 211 in the error resolution system 101.

At block 312, the service determining module 202 performs decoding of each of the one or more values in the matrix.

At block 313, the service determining module 202 identifies the error code 210 to be associated with at least one of the one or more predefined errors 218 and the new error based on the decoding.

Step at block 314 may be performed when the error code 210 may be identified to be associated with the one or more predefined errors 218. Step at block 315 may be performed when the error code 210 may be identified to be associated with the new error.

At block 314, the service determining module 202 may identify the one or more services 211 associated with the error code 210.

At block 315, the service determining module 202 may perform correlation analysis of the error code 210 and each of the one or more predefined errors.

Figure 3D:
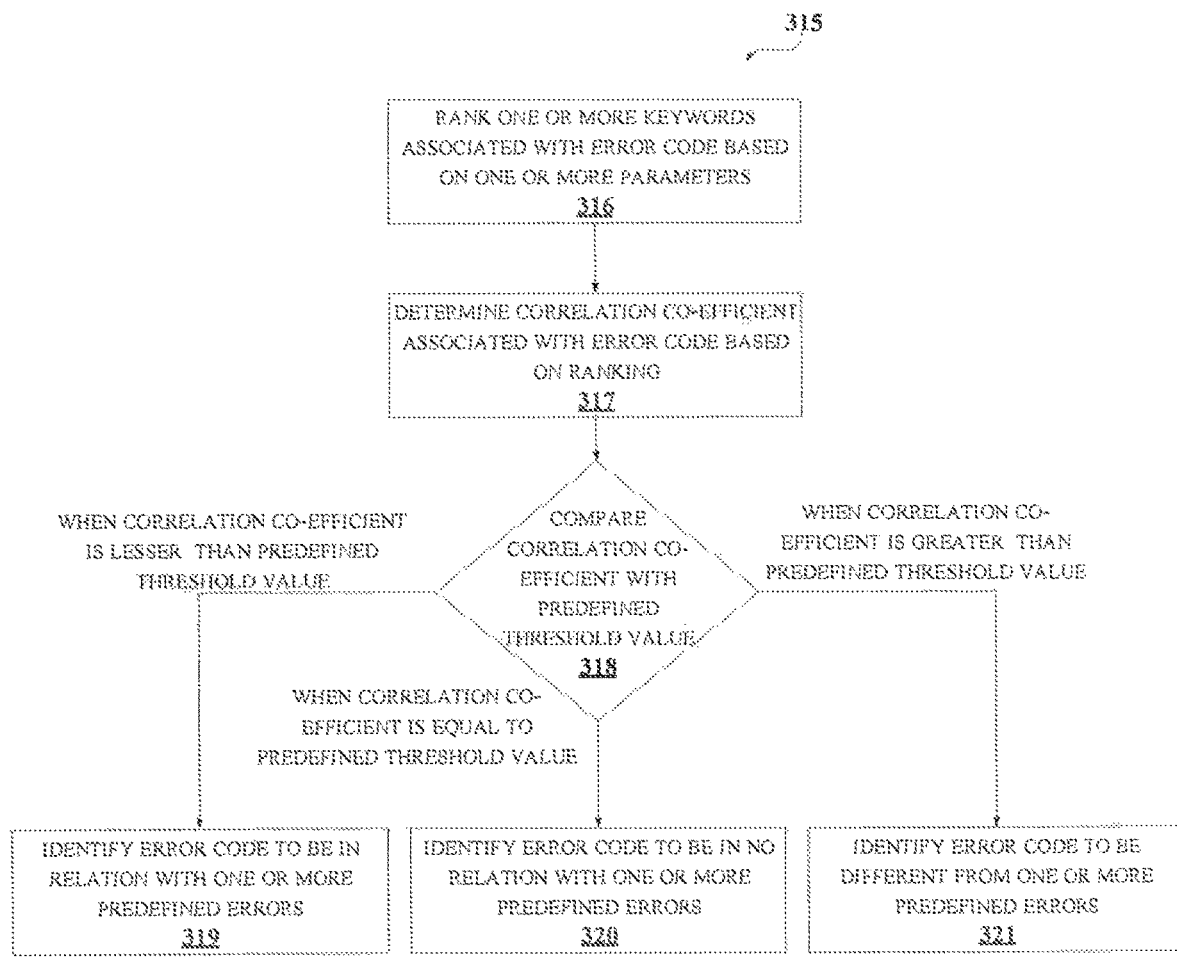
FIG. 3d illustrates a flowchart showing an exemplary method for performing correlative analysis of error code and each of one or more predefined errors in accordance with some embodiments of present disclosure.

FIG. 3d illustrates a flowchart showing an exemplary method for performing the correlation analysis of the error code 210 and each of the one or more predefined errors 218.

At block 316, the service determining module 202 ranks one or more keywords associated with the error code 210 based on the one or more parameters.

At block 317, the service determining module 202 determines correlation co-efficient 219 associated with the error code 210 based on the raking.

At block 318, the service determining module 202 compares the correlation co-efficient 219 with the predefined threshold value 220. Step at block 319 may be performed when the correlation coefficient 219 is lesser than the predefined threshold value 220. Step at block 320 may be performed when the correlation co-efficient 219 is equal to the predefined threshold value 220. Step at block 321 may be performed when the correlation co-efficient 219 is greater than the predefined threshold value 220.

At block 319, the service determining module 202 identifies the error code 210 to be in relation with the one or more predefined errors 218 when the correlation co-efficient 219 is lesser than the predefined threshold value 220.

At block 320, the service determining module 202 identifies the error code 210 to be in no relation with the one or more predefined errors 218 when the correlation co-efficient 219 is equal to the predefined threshold value 220.

At block 321, the service determining module 202 identifies the error code 210 to be different from the one or more predefined errors 218 when the correlation co-efficient 219 is greater than the predefined threshold value 220.

As illustrated in FIG. 3a-3d, the methods 300, 303, 302 and 315 may include one or more blocks for executing processes in the error resolution system 101. The methods 300, 303, 302 and 315 may be described in the general context of computer executable instructions. Generally, computer executable instructions can include routines, programs, objects, components, data structures, procedures, modules, and functions, which perform particular functions or implement particular abstract data types.

The order in which the methods 300, 303, 302 and 315 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Computing System

Figure 4:
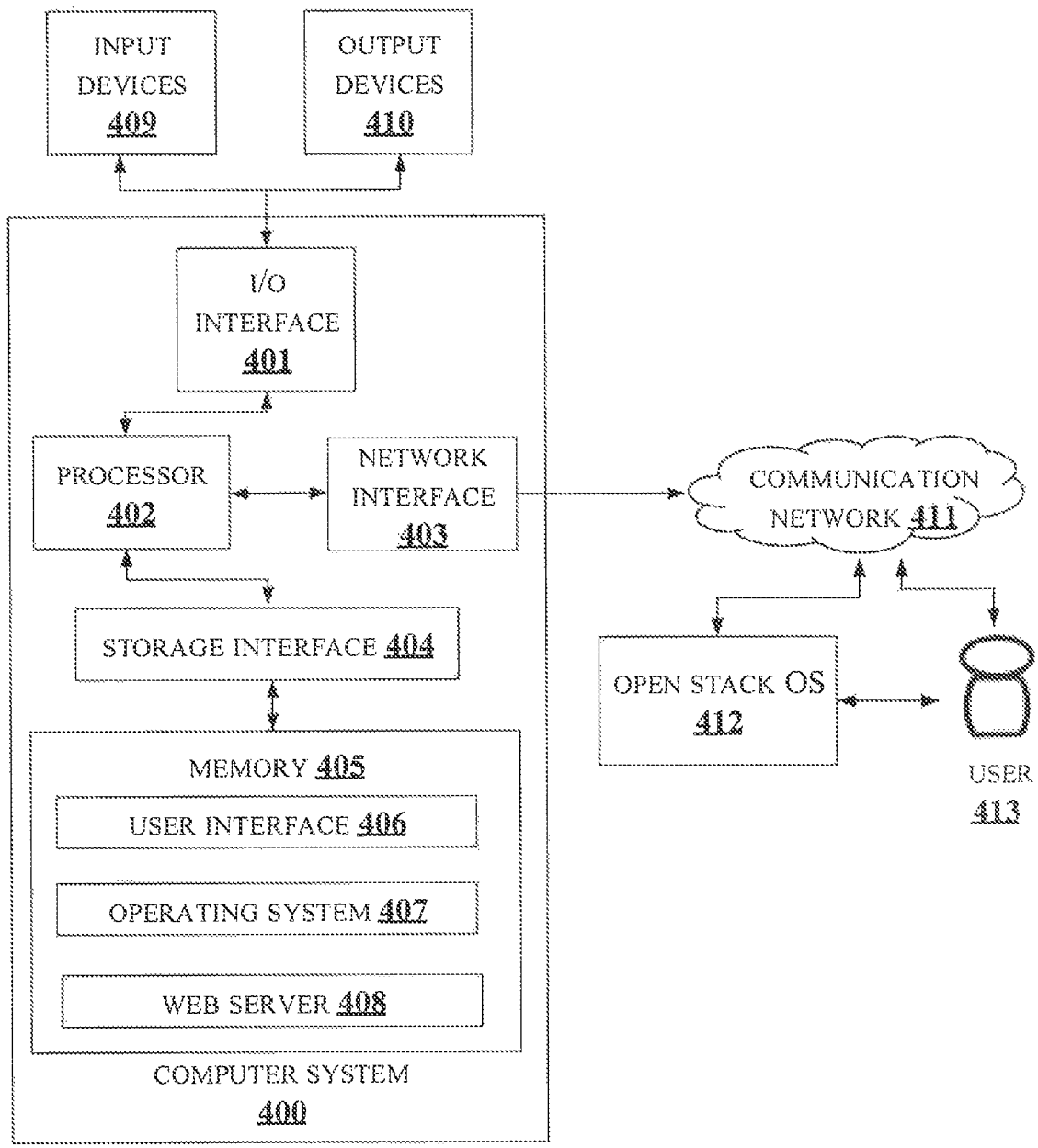
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be used to implement the error resolution system 101. The computer system 400 may include a central processing unit ("CPU" or "processor") 402. The processor 402 may include at least one data processor for executing processes in Virtual Storage Area Network. The processor 402 may include specialized processing units such as, integrated system (bus) controllers, memory management control units, floating point units, graphics processing units, digital signal processing units, etc.

The processor 402 may be disposed in communication with one or more input/output (I/O) devices 409 and 410 via I/O interface 401. The I/O interface 401 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices 409 and 410. For example, the input devices 409 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 410 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 400 may consist of the error resolution system 101. The processor 402 may be disposed in communication with the communication network 411 via a network interface 403. The network interface 403 may communicate with the communication network 411. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 411 may include, without limitation, a direct interconnection, local area network (LAN), wide area network (WAN), wireless network (e.g., using Wireless Application Protocol), the Internet, etc. Using the network interface 403 and the communication network 411, the computer system 400 may communicate with an open stack OS 412 and a user 413 for resolving an error of the open stack OS 412. The network interface 403 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 411 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407 etc. In some embodiments, computer system 400 may store user/application data 406, such as, the data, variables, records, etc., as described in this disclosure. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages

An embodiment of the present disclosure provides an automated error resolution system for resolving errors in open stack OS by excluding dependency of an expert user.

An embodiment of the present disclosure may be soluble to any hardware architecture and hence capable of syncing up with any open stack OS.

An embodiment of the present disclosure provisions automatic allocation and de-allocation of resources to the services which supports service bring up/down operations as per requirements of user.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMS, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3a-3d show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Error resolution system |
| 102 | Open stack OS |
| 103 | User |
| 104 | Communication network |
| 105 | Repository |
| 106 | Processor |
| 107 | I/O interface |
| 108 | Modules |
| 109 | Memory |
| 201 | Error code receiving module |
| 202 | Service determining module |
| 203 | Log files and resolver retrieving module |
| 204 | Predefined action plan determining module |
| 205 | Error resolving module |
| 206 | Service enable/disable identification module |
| 207 | Service enabling module |

-continued

| Reference Number | Description |
| --- | --- |
| 208 | Other modules |
| 209 | Data |
| 210 | Error code data |
| 211 | Service data |
| 212 | Log file data |
| 213 | Resolver data |
| 214 | Predefined action plan data |
| 215 | User requirement data |
| 216 | Resource package data |
| 217 | Identification number data |
| 218 | Predefined error data |
| 219 | Correlation co-efficient data |
| 220 | Predefined threshold value |
| 221 | Other data |
| 400 | Computer System |
| 401 | I/O Interface |
| 402 | Processor |
| 403 | Network Interface |
| 404 | Storage Interface |
| 405 | Memory |
| 406 | User Interface |
| 407 | Operating System |
| 408 | Web Server |
| 409 | Input Devices |
| 410 | Output Devices |
| 411 | Communication Network |
| 412 | Open stack OS |
| 413 | User |

We claim:

1. A method for resolving an error in an open stack operating system (OS), comprising:
receiving, by an error resolution system, an error code relating to an error in an open stack OS associated with the error resolution system;
determining, by the error resolution system, one or more services associated with the error code;
retrieving, by the error resolution system, at least one of one or more log files from the open stack OS and a resolver associated with the one or more services, wherein the one or more services are enabled in the error resolution system for the retrieving;
determining, by the error resolution system, a predefined action plan based on at least one of the one or more log files and the resolver; and
resolving, by the error resolution system, the error in the open stack OS based on the determined predefined action plan.

2. The method as claimed in claim 1 further comprising:
identifying, by the error resolution system, the one or more services for retrieving at least one of the one or more log files and the resolver, to be one of enabled and disabled in the error resolution system; and
performing, by the error resolution system, when the one or more services are identified to be disabled, steps of:
retrieving user requirement data from a user associated with at least one of the error resolution system and the open stack OS;
allocating a resource package in the error resolution system to the one or more services based on the user requirement data; and
enabling, by the error resolution system, the one or more services in the error resolution system based on the resource package, for retrieving at least one of the one or more log files and the resolver.

3. The method as claimed in claim 2, wherein the one or more services is identified to be one of enabled and disabled based on an identification number associated with each of the one or more services in the error resolution system.

4. The method as claimed in claim 1, wherein at least one of the one or more log files and the resolver of each of the one or more services is stored in a corresponding memory session assigned by the error resolution system.

5. The method as claimed in claim 1, wherein the one or more services associated with the error code is determined based on analysis of the one or more services, wherein the analysis comprises:
generating a matrix indicating one or more values associated with the error code in relation with each of the one or more services in the error resolution system;
performing decoding of each of the one or more values;
identifying the error code to be associated with at least one of one or more predefined errors and a new error based on the decoding;
identifying the one or more services associated with the error code when the error code is identified to be associated with the one or more predefined errors; and
performing correlative analysis of the error code and each of the one or more predefined errors, for determining the one or more services associated with the error code, when the error code is identified to be associated with the new error.

6. The method as claimed in claim 5, wherein performing the correlative analysis of the error code comprises:
ranking one or more keywords associated with the error code based on one or more parameters;
determining a correlation co-efficient associated with the error code based on the ranking; and
comparing the correlation co-efficient with a predefined threshold value to identify one of the error code to be in relation with the one or more predefined errors, the error code to be in no relation with the one or more predefined errors, and the error code to be different from the one or more predefined errors.

7. An error resolution system for resolving an error in an open stack operating system (OS), comprising:
a processor; and
a memory communicatively coupled to the processor, wherein the memory stores processor-executable instructions, which, on execution, cause the processor to:
receive an error code relating to an error in an open stack OS associated with the error resolution system;
determine one or more services associated with the error code;
retrieve at least one of one or more log files from the open stack OS and a resolver associated with the one or more services, wherein the one or more services are enabled in the error resolution system for the retrieving;
determine a predefined action plan based on at least one of the one or more log files and the resolver; and
resolve the error in the open stack OS based on the determined predefined action plan.

8. The error resolution system as claimed in claim 7 further comprising the processor configured to:
identify the one or more services for retrieving at least one of the one or more log files and the resolver, to be one of enabled and disabled in the error resolution system; and
perform, when the one or more services are identified to be disabled, steps of:

retrieving user requirement data from a user associated with at least one of the error resolution system and the open stack OS;

allocating a resource package in the error resolution system to the one or more services based on the user requirement data; and enabling the one or more services in the error resolution system based the resource package, for retrieving at least one of the one or more log files and the resolver.

9. The error resolution system as claimed in claim 8, wherein the one or more services is identified to be one of enabled and disabled based on an identification number associated with each of the one or more services in the error resolution system.

10. The error resolution system as claimed in claim 7, wherein at least one of the one or more log files and the resolver of each of the one or more services is stored in a corresponding memory session assigned by the error resolution system.

11. The error resolution system as claimed in claim 7, wherein the one or more services associated with the error code is determined based on analysis of the one or more services, wherein the analysis comprises:

generating a matrix indicating one or more values associated with the error code in relation with each of the one or more services in the error resolution system;

performing decoding of each of the one or more values;

identifying the error code to be associated with at least one of one or more predefined errors and a new error based on the decoding;

identifying the one or more services associated with the error code when the error code is identified to be associated with the one or more predefined errors; and performing correlative analysis of the error code and each of the one or more predefined errors, for determining the one or more services associated with the error code, when the error code is identified to be associated with the new error.

12. The error resolution system as claimed in claim 11, wherein performing the correlative analysis of the error code comprises:

ranking one or more keywords associated with the error code based on one or more parameters;

determining a correlation co-efficient associated with the error code based on the ranking; and comparing the correlation co-efficient with a predefined threshold value to identify one of the error code to be in relation with the one or more predefined errors, the error code to be in no relation with the one or more predefined errors, and the error code to be different from the one or more predefined errors.

13. A non-transitory computer readable medium including instructions stored thereon that when processed by at least one processor cause a device to perform operations comprising:

receiving an error code, relating to an error in an open stack operating system (OS) associated with the error resolution system;

determining one or more services associated with the error code;

retrieving at least one of one or more log files from the open stack OS and a resolver associated with the one or more services, wherein the one or more services are enabled in the error resolution system for the retrieving;

determining a predefined action plan based on at least one of the one or more log files and the resolver; and resolving the error in the open stack OS based on the determined predefined action plan.

14. The medium as claimed in claim 13 further comprising:

identifying the one or more services for retrieving at least one of the one or more log files and the resolver, to be one of enabled and disabled in the error resolution system; and performing, when the one or more services are identified to be disabled, steps of:

retrieving user requirement data from a user (103) associated with at least one of the error resolution system and the open stack OS;

allocating a resource package in the error resolution system to the one or more services based on the user requirement data; and enabling, by the error resolution system, the one or more services in the error resolution system based on the resource package, for retrieving at least one of the one or more log files and the resolver.

15. The medium as claimed in claim 14, wherein the one or more services is identified to be one of enabled and disabled based on an identification number associated with each of the one or more services in the error resolution system.

16. The medium as claimed in claim 13, wherein at least one of the one or more log files and the resolver of each of the one or more services is stored in a corresponding memory session assigned by the error resolution system.

17. The medium as claimed in claim 13. wherein the one or more services associated with the error code is determined based on analysis of the one or more services, wherein the analysis comprises:

generating a matrix indicating one or more values associated with the error code in relation with each of the one or more services In the error resolution system;

performing decoding of each of the one or more values;

identifying the error code to be associated with at least one of one or more predefined errors and a new error based on the decoding;

identifying the one or more services associated with the error code when the error code is identified to be associated with the one or more predefined errors; and performing correlative analysis of the error code and each of the one or more predefined errors, for determining the one or more services associated with the error code, when the error code is identified to be associated with the new error.

18. The medium as claimed in claim 17, wherein performing the correlative analysis of the error code comprises:

ranking one or more keywords associated with the error code based on one or more parameters;

determining a correlation co-efficient associated with the error code based on the ranking; and comparing the correlation co-efficient with a predefined threshold value to identify one of the error code to be in relation with the one or more predefined errors, the error code to be in no relation with the one or more predefined errors, and the error to be different from the one or more predefined errors.

* * * * *